May 19, 1953     A. D. EDWARDS     2,638,713

PLANT PACKER

Filed Nov. 15, 1949

Inventor

Arnold D. Edwards

By *Clarence A. O'Brien and Harvey B. Jacobson*
Attorneys

Patented May 19, 1953

2,638,713

UNITED STATES PATENT OFFICE 2,638,713

PLANT PACKER

Arnold D. Edwards, Jacksonville, Fla.

Application November 15, 1949, Serial No. 127,467

4 Claims. (Cl. 47—1)

This invention comprises novel and useful improvements in plant packers.

Various objects of this invention are to provide a plant packer which is operable from a standing position by a single downward thrust of the handle, together with improved jaws for the plant packer and means for limiting the opening of the jaws, and which is of simple construction yet durable and highly efficient for the purposes intended.

Important features of this invention reside in the provision for arcuately shaped jaws with downwardly tapered arcuately shaped inserts for the jaws, together with the provision for a handle that is slidably journaled on a vertical standard, and which handle is operatively connected to the jaws, with a further provision for an adjustable screw which limits the opening of the jaws.

These together with various other ancillary objects and features are attained by this device, a preferred embodiment of which has been illustrated, for purposes of example only, in the accompanying drawings, wherein.

In the accompanying drawings wherein like numbers denote similar parts throughout the various views, figure 10 represents the plant packing device in general.

Figure 1:
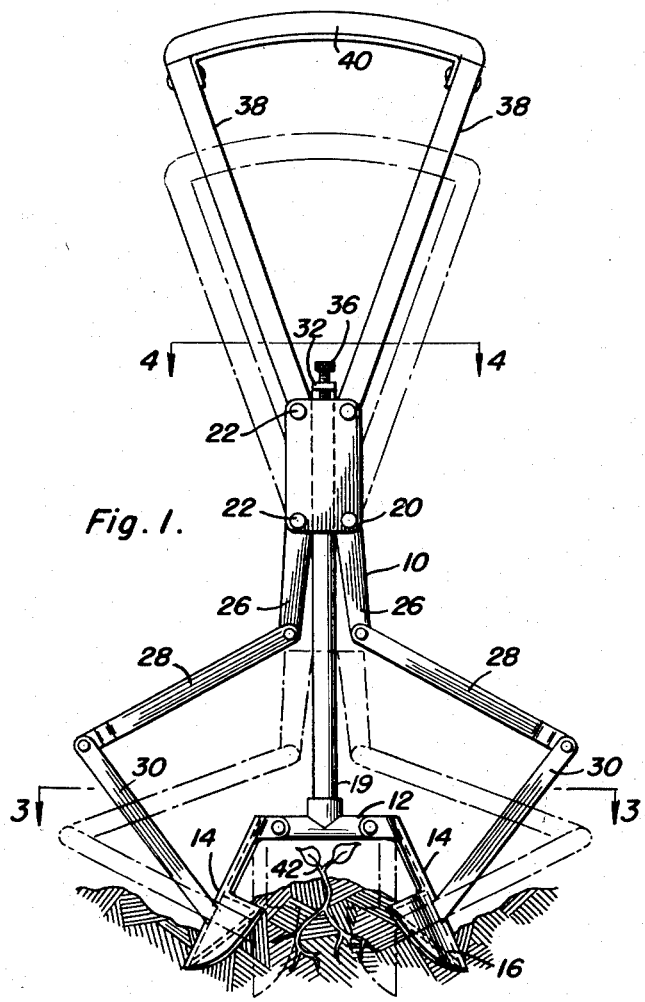
Figure 1 is a vertical front view of the device, the full lines showing the position of the component parts when the jaws are in their expanded position, the dotted lines showing the packer with the jaws closed.

As now clearly shown in Figure 1, the plant packer 10 has a cross-head 12 to which is pivotally mounted a pair of jaws 14, the jaws having a lower arcuately shaped section 16 to which a pair of downwardly tapered arcuately shaped inserts 18 is preferably attached.

Mounted intermediate the ends of cross-head is a vertical standard 19 upon which is slidably received a pair of laterally spaced plates 20, rigidly attached, as by means of rivets 22 or the like, to a pair of laterally spaced strips 24.

Outwardly and downwardly inclined extensions 26 are attached to, and preferably formed as a part of the strips 24, the extensions 26 pivotally receiving a connecting link 28, the other end of which links are terminally pivoted to operating arms 30 which arms are otherwise rigidly secured to the arcuately shaped sections 16 of the jaws 14, thereby providing an operating linkage for the packer jaws.

A plate 32 is mounted transversely on the standard 19 and has provided therein a threaded bore 34 which is in vertical alignment with one of the plates 20. Threaded in the bore 34 is an adjusting screw 36 which is engageable with the vertically aligned plate 20 to limit upward movement thereof, and thereby adjustably limit the opening of the jaws 14.

Upwardly and outwardly inclined extensions 38 are attached to, and preferably formed as part of the strips 24, forming handle supports, to which supports is attached a transverse handle bar 40.

From the foregoing description it is believed that the operation of the device will now be readily apparent.

Figure 2:
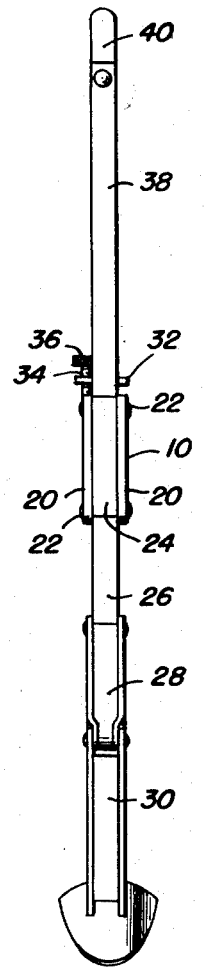
Figure 2 is a vertical side view of the device.
Figure 3:
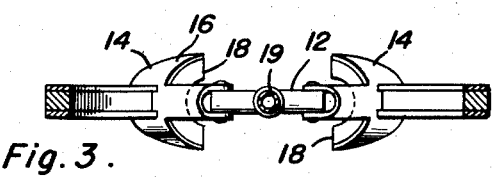
Figure 3 is a horizontal sectional view of the device taken substantially on the plane 3—3 of Figure 1 showing details of the jaw construction.
Figure 4:
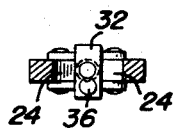
Figure 4 is a horizontal sectional view of the device taken on the plane 4—4 of Figure 1.

A series of plants indicated generally by the numeral 42 are placed by any means, which in no way forms a part of this invention, in recesses in the ground, the device 10 with the handle 40 in its upper position and the jaws 14 correspondingly open, is positioned so as to straddle the plant. A downward thrust on the handle 40 causes the connecting links 28 and the arms 30 to assume the dotted line position shown in Figure 1, thereby closing the jaws 14 and packing the ground about the plant 42. As will be readily appreciated from a consideration of Figure 2, the tapered arcuately shaped inserts 18 will compress the ground adjacent the upper portion of the inserts more compactly than the ground adjacent the lower portion of the inserts, thereby preventing water initially poured around the recess in the ground, from escaping. It will also be appreciated that the arcuately shaped jaws will compress the ground around the plant substantially uniformly. The handle 40 is then elevated which causes the jaws 14 to open, and when the plate 20 engages the adjustable screw 36, further elevation of the handle will remove the plant packer 10 from contact with the ground, and in readiness for the next plant packing cycle.

From the above description it is believed the operation of the device will be readily understood, and further explanation is believed unnecessary. However since numerous modifications will readily occur to those skilled in the art after a consideration of the foregoing specification and accompanying drawings, it is not intended to limit the invention to the exact apparatus described, but all suitable modifications may be resorted to falling within the scope of the appended claims.

Having described the invention, what is claimed as new is:

1. A plant packer comprising a pair of arcuately shaped packing jaws, a cross-head, said jaws being mounted adjacent the ends of said cross-head for vertical pivotal movement relative thereto, a vertical standard mounted intermediate the ends of said cross-head, operating arms rigidly attached intermediate the ends of each of said jaws and diverging upwardly therefrom, a pair of laterally spaced vertical plates lying adjacent said standard, vertical laterally spaced strips rigidly connecting said plates, said plates and said strips forming a bearing therebetween, said standard being slidably receivable in said bearing, downwardly and outwardly deflected lower extensions on said strips, connecting rods terminally pivoted to said lower extensions and said arms, upwardly and outwardly deflected supports attached to the upper ends of said strips, a transverse handle bar connecting said supports, screw means mounted on said standard for adjustably limiting the opening of said jaws, said cross head, operating arms, connecting rods and laterally spaced strips being substantially coplanar.

2. A plant packer comprising a pair of arcuately shaped packing jaws, a cross-head, said jaws being mounted adjacent the ends of said cross-head for vertical pivotal movement relative thereto, a vertical standard mounted intermediate the ends of said cross-head, operating arms rigidly attached intermediate the ends of each of said jaws, a pair of laterally spaced vertical plates lying adjacent said standard, vertical laterally spaced strips rigidly connecting said plates, said plates and said strips forming a bearing therebetween, said standard being slidably receivable in said bearing, downwardly and outwardly deflected lower extensions on said strips, connecting rods terminally pivoted to said lower extensions and said arms, upwardly and outwardly deflected supports attached to the upper ends of said strips, a transverse handle bar connecting said supports, screw means mounted on said standard for adjustably limiting the opening of said jaws, tapered and arcuately shaped inserts in said jaws.

3. A plant packer comprising a cross-head, a standard secured to said cross-head intermediate the ends thereof and extending perpendicular thereto, a pair of parallel plates disposed on opposite sides of said standard, a pair of bearing members secured between said plates on opposite sides of said standard to slidably and guidably receive said standard therebetween, a U-shaped handle forming member having the legs thereof integrally secured to the upper ends of said bearing members, a pair of elongated packing jaws pivotally attached to the ends of said cross-head, operating arms secured to each of said jaws intermediate the ends thereof and diverging upwardly therefrom, and connecting links each pivotally attached at one end to one of said arms, and means pivotally attaching the other ends of said links to said bearing members, the longitudinal axes of said cross head, operating arms and said connecting links being substantially coplanar.

4. A plant packer comprising a cross head, packing jaws pivoted adjacent the ends of said cross head, a standard mounted on said cross head intermediate the ends thereof, a pair of opposing, flat plates slidably receiving the standard therebetween, a pair of vertically extending strips on opposite sides of said standard rigidly connecting the marginal edges of said plates to prevent lateral sliding of said plates with respect to the standard, upper portions of said strips extending above said plates and being handle arms, lower portions of said strips extending below said plates, upwardly diverging operating arms extending from said jaws, connecting rods extending between and pivotally secured to the free ends of said operating rods and the lower portions of said strips, said cross head and said operating arms being coplanar.

ARNOLD D. EDWARDS.

References Cited in the file of this patent

UNITED STATES PATENTS

| Number | Name | Date |
| --- | --- | --- |
| 266,939 | Wilfert | Oct. 31, 1882 |
| 289,186 | Visscher | Nov. 27, 1883 |
| 516,274 | Morgan | Mar. 13, 1894 |
| 610,625 | Grim | Sept. 13, 1898 |
| 1,077,822 | Engleman | Nov. 4, 1913 |
| 1,187,316 | Higby | June 13, 1916 |
| 1,496,647 | Kennedy | June 3, 1924 |